(12) United States Patent
Gustafson et al.

(10) Patent No.: US 6,722,284 B2
(45) Date of Patent: Apr. 20, 2004

(54) STEERING MECHANISM FOR RAIL GUIDED ROBOTS IN A LIBRARY

(75) Inventors: Gary Gustafson, Westminster, CO (US); Timothy C. Ostwald, Louisville, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 10/015,438

(22) Filed: Dec. 13, 2001

(65) Prior Publication Data

US 2003/0110974 A1 Jun. 19, 2003

(51) Int. Cl.[7] ................................................. B66B 9/00
(52) U.S. Cl. ........................ 105/30; 105/141; 105/165; 104/245
(58) Field of Search ............................... 105/3, 30, 33, 105/34.1, 47, 82, 141, 144, 145, 165, 167, 169, 170; 104/89, 93, 119, 118, 245, 246, 247

(56) References Cited

U.S. PATENT DOCUMENTS

| | | | | | |
|---|---|---|---|---|---|
| 3,056,359 A | * | 10/1962 | Fey | ............................. | 104/95 |
| 3,886,869 A | * | 6/1975 | Tantlinger | .................. | 104/23.2 |
| 4,015,537 A | * | 4/1977 | Graef et al. | ................. | 104/107 |
| 4,172,423 A | * | 10/1979 | Monne | ........................ | 104/107 |
| 4,260,869 A | * | 4/1981 | Slavens et al. | ............. | 104/119 |
| 4,794,866 A | * | 1/1989 | Brandis et al. | ............. | 104/120 |
| 2001/0000062 A1 | * | 3/2001 | Ostwald et al. | .......... | 104/88.02 |

FOREIGN PATENT DOCUMENTS

WO     WO 97/12830    * 4/1997

* cited by examiner

Primary Examiner—Mark T. Le
(74) Attorney, Agent, or Firm—Carstens, Yee & Cahoon, LLP

(57) ABSTRACT

A steering mechanism for a track-mounted robot is provided. The steering mechanism comprises guide wheels, which are fixed to yokes that pivot around secondary drive wheels. The pivot action of the yokes allows the guide wheels to maintain full contact with the track and steer as the robot traverses straight and curved portions of the track. Linkage components attach the yokes to a cam follower which follows a cam surface in the track in order to force the proper angle of steering for the guide wheels.

7 Claims, 9 Drawing Sheets

STEERING MECHANISM FOR RAIL GUIDED ROBOTS IN A LIBRARY

BACKGROUND OF THE INVENTION

1. Field of the Invention

The present invention relates generally to robotic media storage library systems, and more specifically to a redundant system that includes a plurality of independent robots in the form of robotic pods.

2. Background of the Invention

The current enterprise class library system contains multiple independent robots for concurrently manipulating multiple media cartridges. The library system comprises an array of media storage cells and media cartridge players. A system of rails is used to guide robotic pods through all of the locations on the array.

Fixed guide wheels on a robot rolling on tracks are subject to skidding when the robot changes its direction of travel. This skidding will result in increased noise and wear on the robot wheels. The problem is compounded as the load on the wheels increases.

Therefore, it would be desirable to have a method for reducing noise and wear on the wheels by using a steering mechanism to accommodate changes in the travel direction of the storage library robots.

SUMMARY OF THE INVENTION

The present invention provides a steering mechanism for a track-mounted robot. A robot chassis is driven on a track in a longitudinal direction by a pair of drive wheels that are axially fixed to the chassis and connected to drive motor via a belt. The drive wheels are held tightly to the track by a single axially parallel cam follower wheel located between the drive wheels on the opposing side of the track. The cam follower wheel is spring loaded via a linear slider connected to the chassis, and its motion is restricted to move perpendicular to both drive wheel axes. This spring loaded cam follower wheel and slider assembly squeezes the track between the two drive wheels and cam follower wheel.

The steering mechanism comprises fixed upper guide wheels, and spring loaded lower guide wheels that are attached to yokes that pivot around the drive wheels. The upper guide wheel on each yoke is axially fixed to each yoke and rolls along the track on the surface adjacent to the track surface that the drive wheels roll against. The lower guide wheel is attached to the yoke with a pivoting arm and rolls along the opposing track surface from the upper guide wheel. The pivoting arm of the lower guide wheel is spring loaded toward the upper guide wheel, which squeezes the track between the guide wheels. The pivot action of the yokes allows the guide wheels to maintain full contact with the track and steer tangent to the direction of motion as the robot traverses straight and curved portions of the track. Linkage components attach the yokes to the cam follower wheel, which follows the cam surface of the track in order to force the proper angle of steering for the guide wheels.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
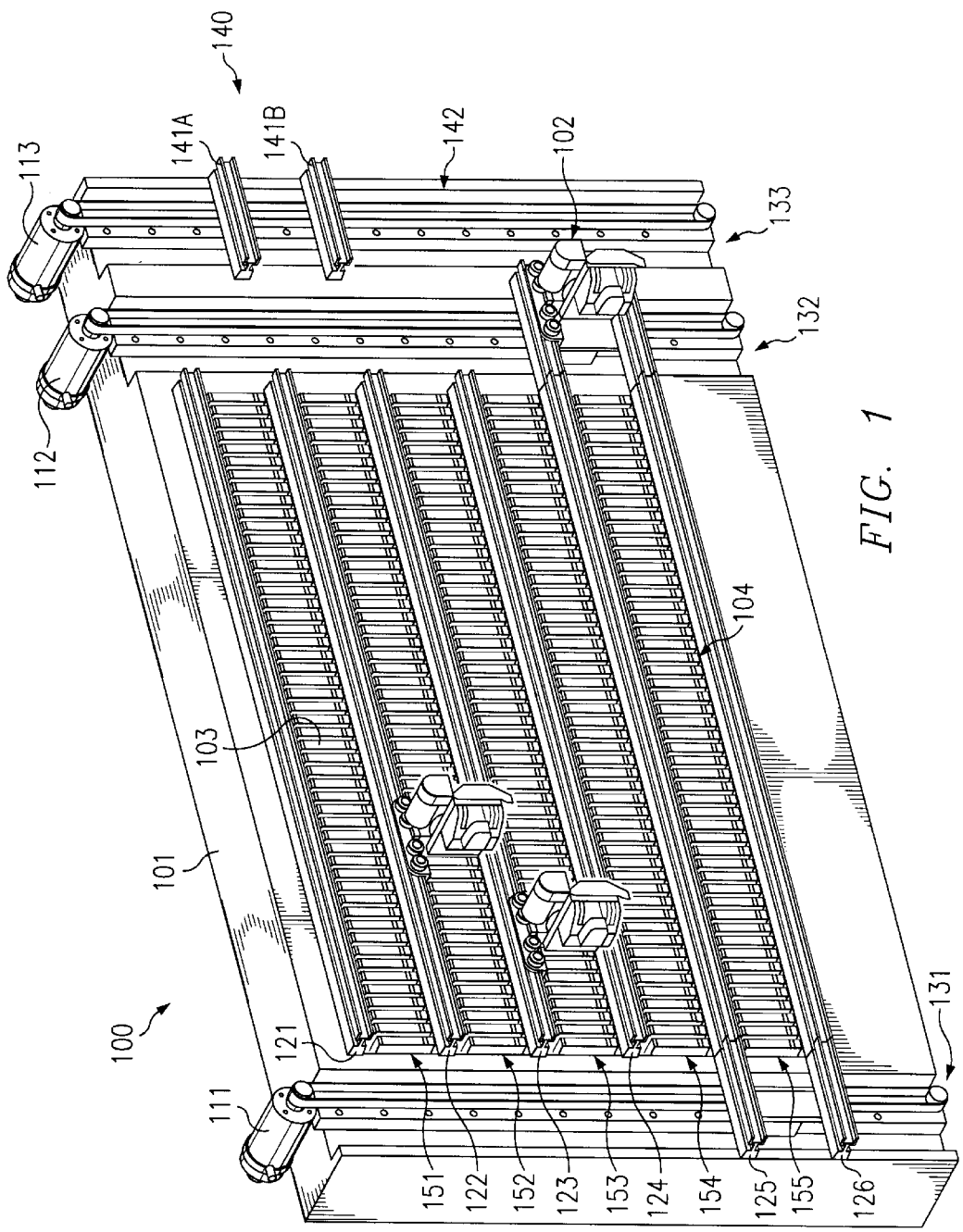
FIG. 1 depicts a perspective pictorial diagram illustrating the architecture of a single library storage module in which the present invention may be implemented.

The architecture of the present automated library system 100 is illustrated in FIG. 1 and contains the multiple independent robots 102 to enable the library system 100 to concurrently manipulate multiple media cartridges 105. The library system 100 comprises a two-dimensional array of media cartridge storage cells 103 and media cartridge players 104 that are mounted in a frame 101. A system of rails 121–126 is used to guide robotic pods 102 through all of the locations in the array, which eliminates the need for any steering or guide mechanisms on board the robotic pods 102, resulting in a reduction in the mass of the robotic pods 102. The rail system 121–126 also constrains the movement of the robotic pods 102 into horizontal and vertical movements, thereby simplifying the control algorithms for collision avoidance that are required by a typical random moveable object handling system based on horizontal, vertical and diagonal degrees of freedom. The robotic pods 102 contain a moveable chassis that is capable of transporting robotic components, such as media cartridge pickers, bar code reading devices, and other task oriented sub-modules, on the storage library rail system.

As shown in FIG. 1, the frame 101 is designed to receive a plurality of rows 151–154 of media cartridge storage cells 103, each of which is designed to house a single media cartridge 105. The media cartridge players 104 are shown in an arbitrary location in a horizontal row 155 at the bottom of the frame 101, although the library system 100 can incorporate media cartridge players 104 at any location in the frame 101 to optimize performance. The robotic pods 102 are attached to the frame 101 via horizontal guide rails 121–126, which serve to frame the media cartridge storage cells 103 and media cartridge players 104 on the top and bottom sides thereof. FIG. 1 shows an array of media storage cells 103 fully populated with media cartridges 105 of any arbitrary type. The robotic pod guide rails 121–126 provide support of the robotic pods 102 in the vertical direction to oppose the force of gravity, and they also provide a meshing surface of suitable design to impart traction in the horizontal direction for motive transport of the robotic pods 102. The robotic pods 102 each incorporate guide wheels and a drive means for propulsion in the horizontal direction along the guide rails 121.

FIG. 1 also shows a plurality of vertical elevator assemblies 131–133 that enable the transfer of the robotic pods 102 in the vertical direction. Multiple vertical elevator assemblies 131–133 are shown in FIG. 1 to exemplify the extensibility and redundancy of the invention. Each of the vertical elevator assemblies 131–133 comprise a set of vertical rails 142 that extend substantially from the top of the frame 101 to the bottom of the frame 101. The vertical rails 142 support a plurality of elevator stations 140, each of which contain short horizontal rail segments 141A, 141B that are identical in cross section to the main horizontal guide rails 121–126. The elevator stations 140 are held in suspension by a drive belt 143 which is made to wrap around a drive pulley attached to a vertical drive motor 113 that is located at the top of each elevator assembly 133. When a vertical displacement is required of any robotic pod 102, the vertical elevator 140 is scheduled to move in alignment to the appropriate level of rows 151–155 to allow transfer of the robotic pod 102 onto the elevator rail section 141A, 141B from the pair of horizontal rails 121–126 that are juxtaposed and abutting to the elevator rails 141A, 141B. Once the robotic pod 102 is located on the elevator station 140, the drive motor 113 is activated to transport the robotic pod 102 to a selected one of rows 151–155 and thence moves on to the pair of horizontal rails 121–126 that correspond to the selected row. Elevator assemblies 131–133 can carry more than one robotic pod 102 at a time by adding elevator platforms 140 to the elevator assemblies 131–133 or by extending the elevator platform length to accommodate multiple robotic pods 102 on a single elevator station 140.

Figure 2:
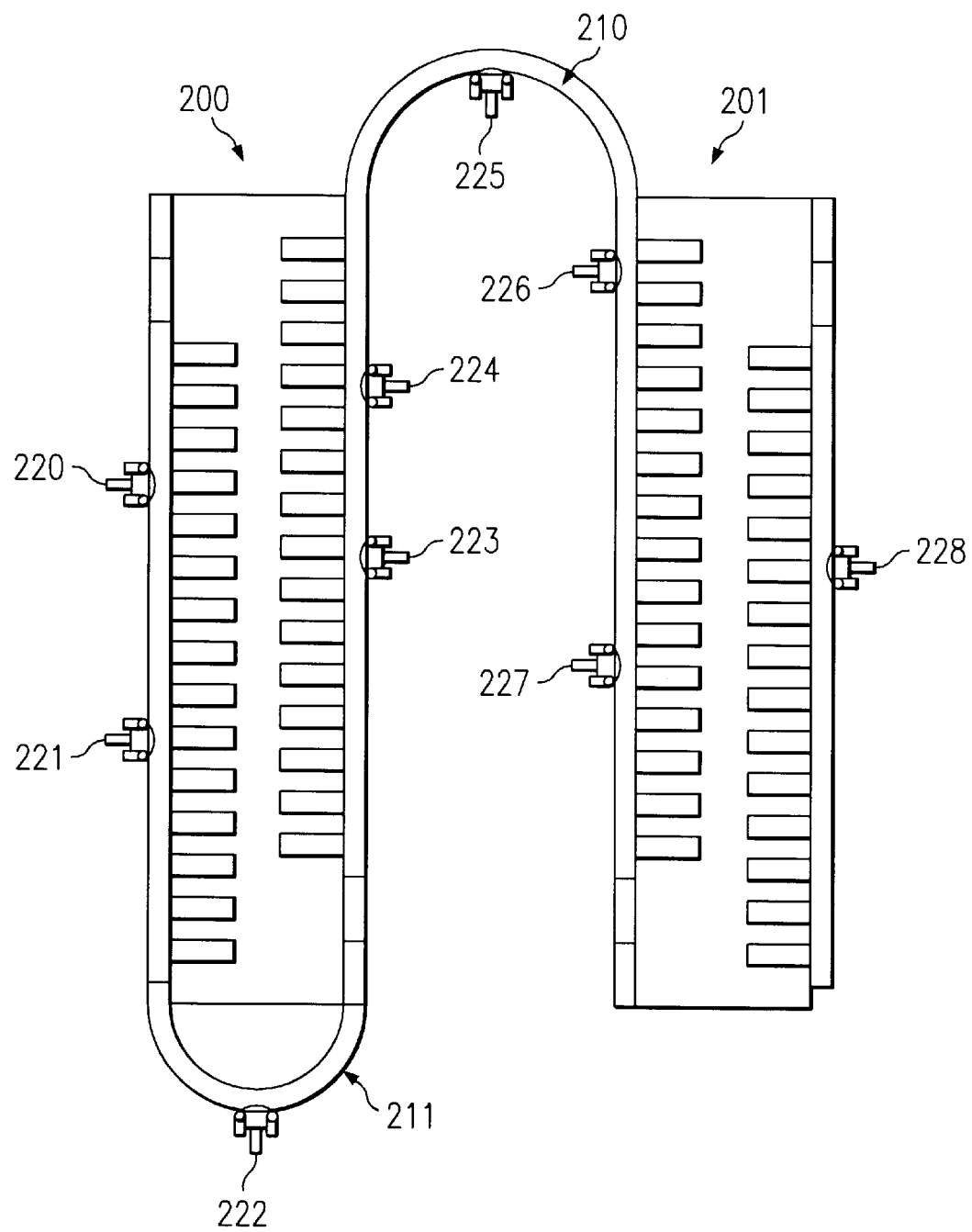
FIG. 2 depicts a schematic diagram illustrating the top view of two library storage modules linked by a robot-track bridge.

Referring to FIG. 2, a schematic diagram illustrating the top view of two library storage modules linked by a robot-rail bridge is depicted. Library modules 200 and 201 are similar to the module depicted in FIG. 1. The rail bridge 210 allows robotic retrievers, e.g., robot 225, to move between the inside rails of modules 200 and 201. Rail bridge 211 permits movement between the inside and outside rails of module 200.

Robot-rail bridges, such as bridges 210 and 211, help integrate banks of library modules. Rail bridges may be connected to library modules at different track levels, and may be dynamically connected and disconnected from the modules during the course of operations.

Figure 3A:
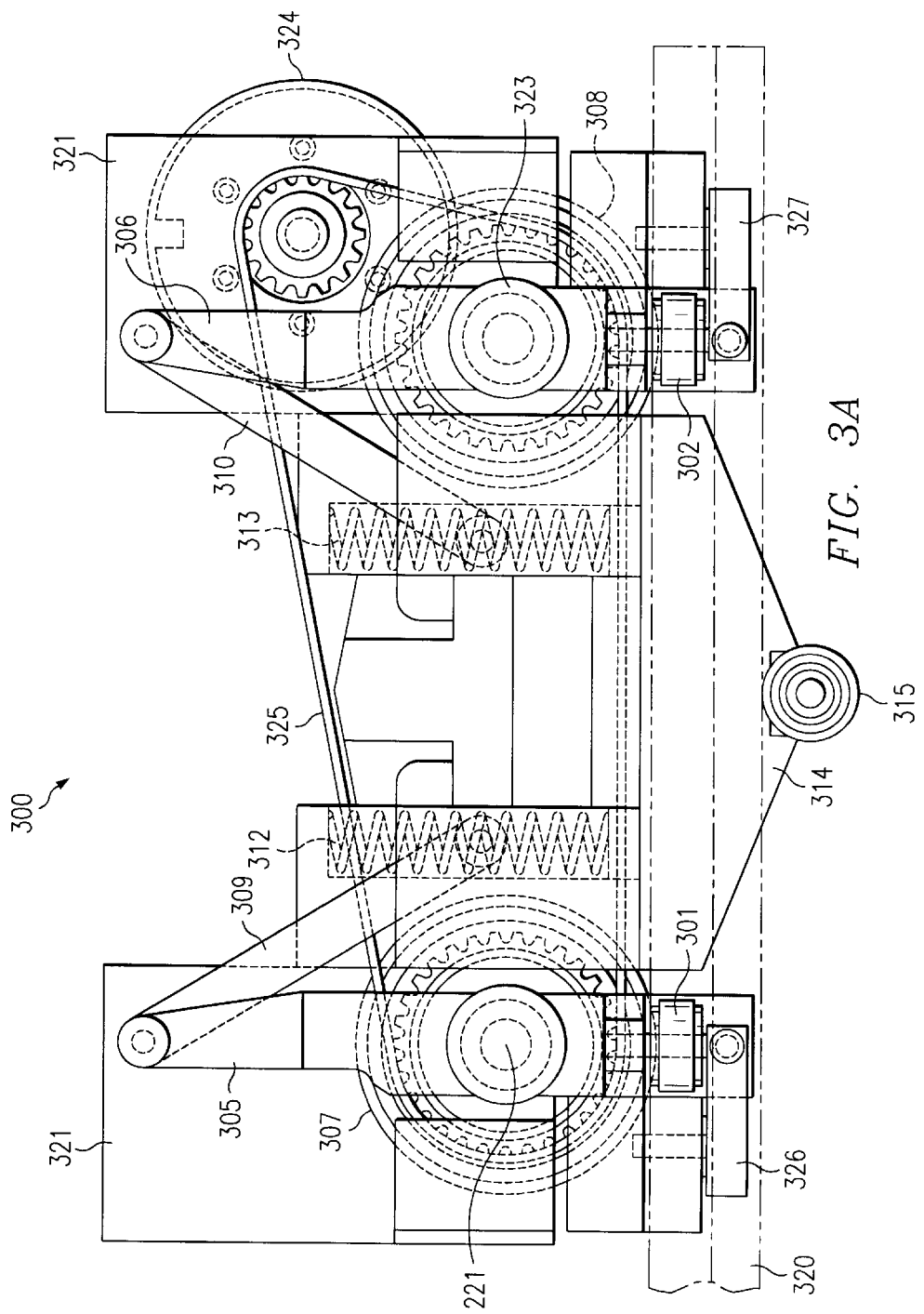
FIG. 3A depicts a top-angle-perspective, schematic diagram illustrating a robot chassis with a robotic steering mechanism in accordance with the present invention.
Figure 3B:
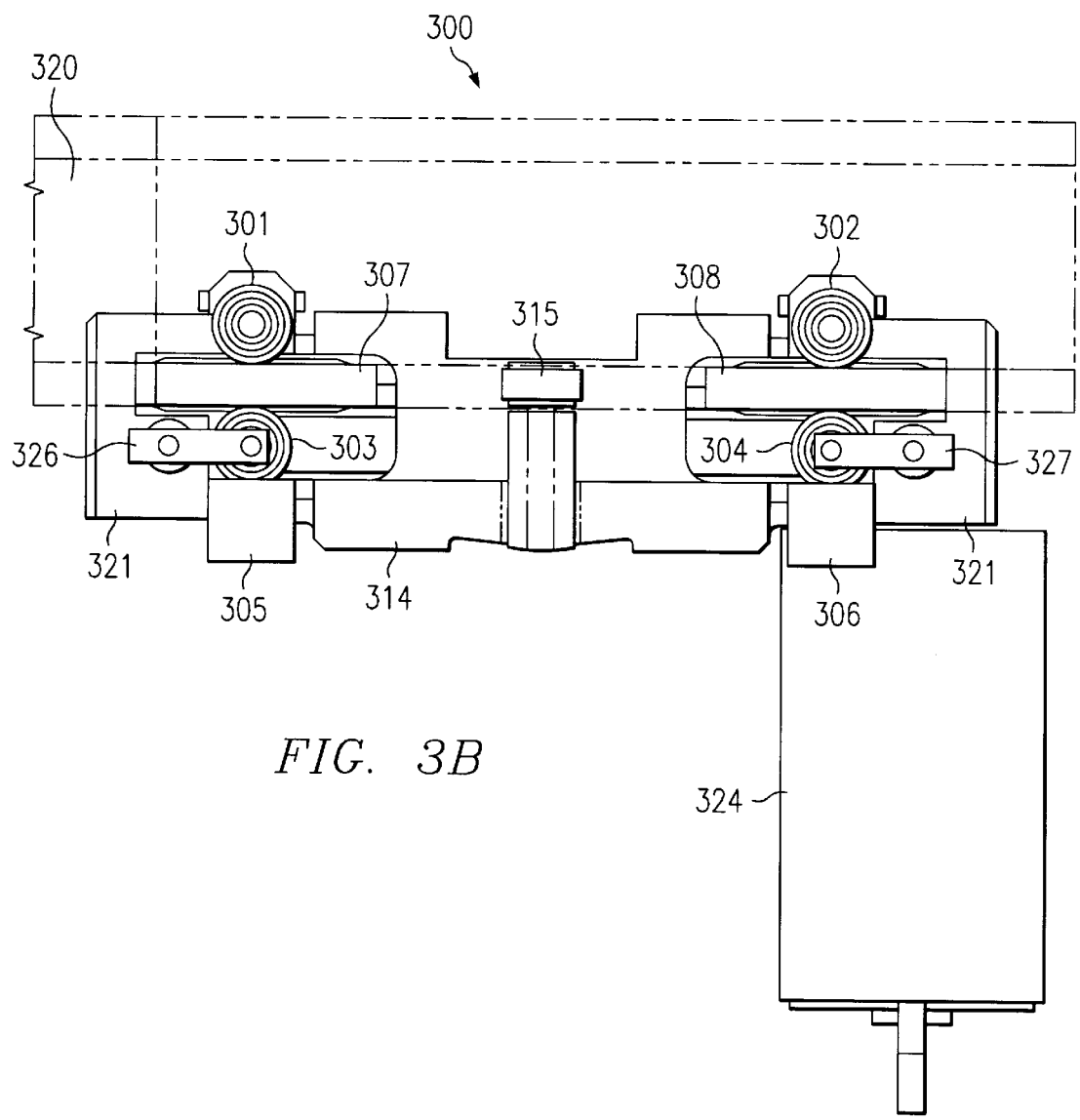
FIG. 3B depicts a front-angle-perspective, schematic diagram illustrating the robot chassis and steering mechanism in accordance with the present invention.
Figure 3C:
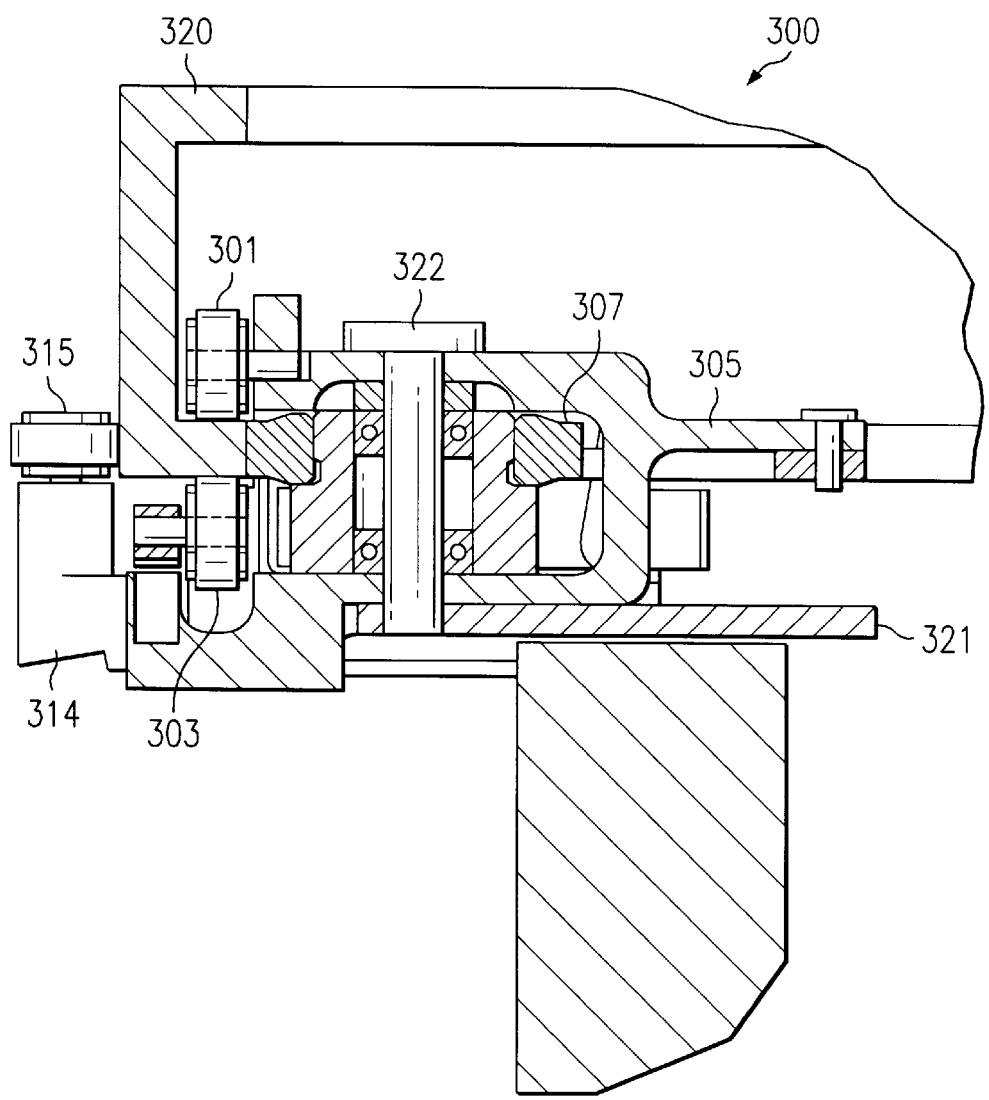
FIG. 3C depicts a cross-section, side angle perspective schematic diagram illustrating the robot chassis and steering mechanism.

Referring to FIG. 3A, a top-angle-perspective, schematic diagram illustrating a robot chassis with a robotic steering mechanism is depicted in accordance with the present invention. FIG. 3B depicts a front-angle-perspective, schematic diagram illustrating the robot chassis and steering mechanism. FIG. 3C depicts a side angle perspective cross-section schematic diagram illustrating the robot chassis and steering mechanism.

A robot chassis 321 is driven on a track 320 in a longitudinal direction by a pair of drive wheels 307 and 308 that are axially fixed to the chassis 321 and connected to drive motor 324 via a belt 325. The drive wheels 307 and 308 are held tightly to the track 320 by a single axially parallel cam follower wheel 315 located between the drive wheels 307 and 308 on the opposing side of the track 320. The cam follower wheel 315 is spring loaded via a linear slider 314 (containing spring elements 312 and 313), which is connected to the chassis 321. The motion of the cam follower wheel 315 is restricted to perpendicular to both drive wheel axes 322 and 323. The spring-loaded cam follower wheel 315 and slider assembly 314 squeezes the track 320 between the two drive wheels 307 and 308 and cam follower wheel 315.

The steering mechanism 300 comprises fixed upper guide wheels 301 and 302, and spring loaded lower guide wheels 303 and 304 that are attached to yokes 305 and 306 that pivot around the drive wheels 307 and 308. The upper guide wheels 301 and 302 are axially fixed to the yokes 305 and 306 and roll along the track 320 on the surface adjacent to the track surface that the drive wheels 307 and 308 roll against. The lower guide wheels 303 and 304 are attached to the yokes 305 and 306 with pivoting arms 326 and 327 and roll along the opposing track surface from the upper guide wheels 301 and 302. The pivoting arms 326 and 327 of the lower guide wheels 303 and 304 are spring loaded toward the upper guide wheels 301 and 302, which squeezes the track 320 between the upper and lower guide wheels.

The pivot action of the yokes 305 and 306 allows the guide wheels 301–304 to steer tangent to the direction of motion as the robot traverses straight and curved portions of the track 320. Linkage components 309 and 310 attach the yokes 305 and 306 to the cam follower wheel 315, which follows the cam surface of the track 320 in order to force the proper angle of steering for the guide wheels 301–304. By remaining tangent to the direction of motion, the guide wheels 301–304 ensure that the drive wheels 307 and 308 maintain full contact with the track 320, even as the track curves inward or outward (illustrated below). By ensuring that the drive wheels 307 and 308 maintain full contact with the track 320, the steering mechanism 300 allows for smooth transitions between straight and curved track sections, eliminating skidding of the drive wheels 307 and 308. Elimination of skidding increases overall robot speed and efficiency, while also reducing the wear and tear on both the drive wheels 307 and 308 and the track surface.

The guide wheels 301–304 and cam follower wheel 315 may be made from several types of material. Examples of such materials include steel, nylon, and neoprene. In a preferred embodiment of the present invention, the guide wheels are composed of nylon plastic with a Teflon coating. These materials are preferred in order to reduce the amount of friction and wear between the guide wheels and the track surface. In addition, non-rolling skids may also be used in place of guide wheels 301–304 and cam follower wheel 315.

Figure 4A:
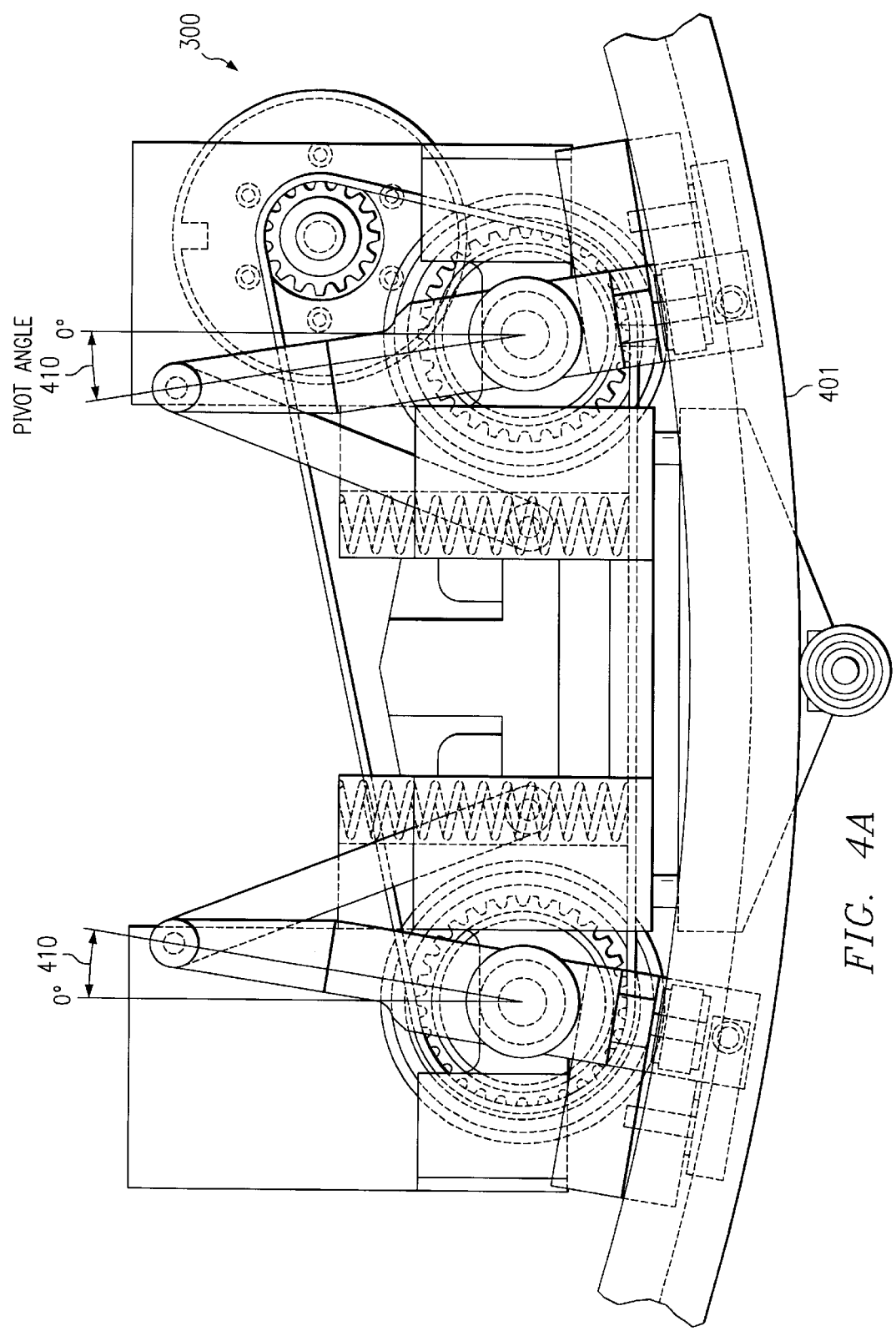
FIG. 4A depicts a top-view, schematic diagram illustrating a robot chassis and steering mechanism on a concave track in accordance with the present invention.

Referring to FIG. 4A, a top-view, schematic diagram illustrating a robot chassis and steering mechanism on a concave track is depicted in accordance with the present invention. The steering mechanism 300 is the same as that illustrated in FIGS. 3A, 3B, and 3C. The concave track section 401 is similar to the rail bridge 210 in FIG. 2. FIG. 4A illustrates the pivot angle 410 of the yokes as the guide wheels pivot outward in order to conform to the curved track 401.

Figure 4B:
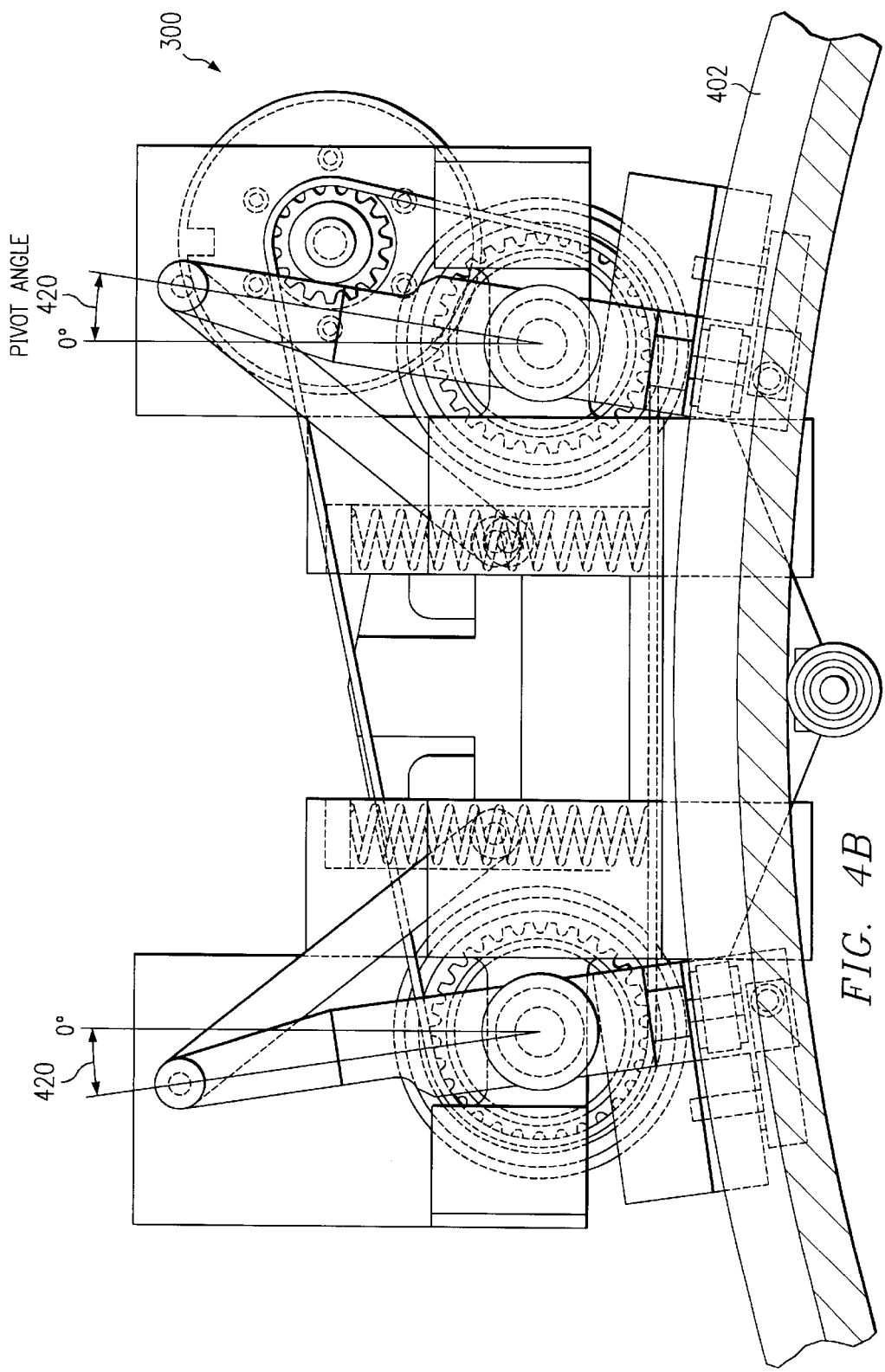
FIG. 4B depicts a top-view, schematic diagram illustrating a robot chassis and steering mechanism on a convex track in accordance with the present invention.

Referring now to FIG. 4B, a top-view, schematic diagram illustrating a robot chassis and steering mechanism on a convex track is depicted in accordance with the present invention. The steering mechanism 300 is the same as that illustrated in FIGS. 3A, 3B, and 3C. The convex track section 402 is similar to rail bridge 211 in FIG. 2. FIG. 4B illustrates the inward pivot of the yokes as the guide wheels conform to the curved track 402, resulting in a pivot angle 420 opposite to the pivot angle 410 in FIG. 4A.

In addition to the pivot yoke design illustrated by steering mechanism 300, the present invention may also be implemented by means of articulated robot designs wherein the guide wheels are coupled to pivoting sections of the robot chassis.

Figure 5B:
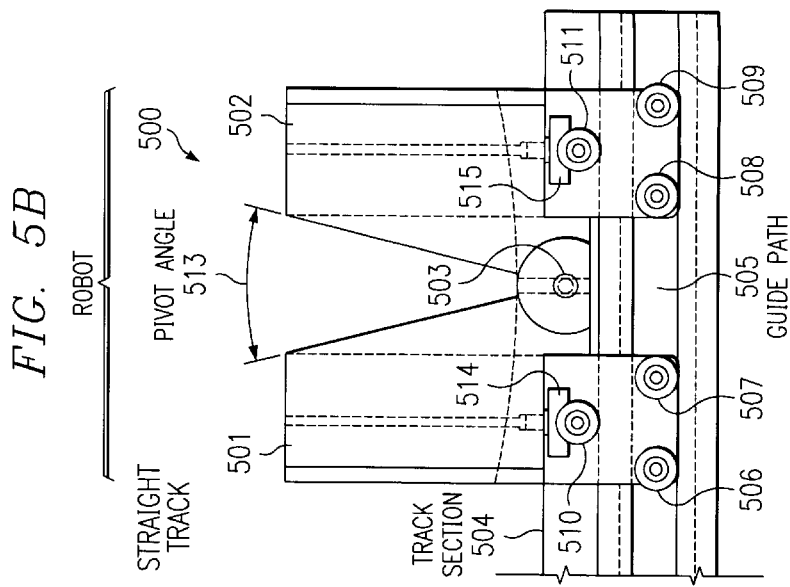
FIG. 5B depicts a top view schematic diagram of the articulated-robot steering mechanism on a straight section of track in accordance with the present invention.
Figure 5A:
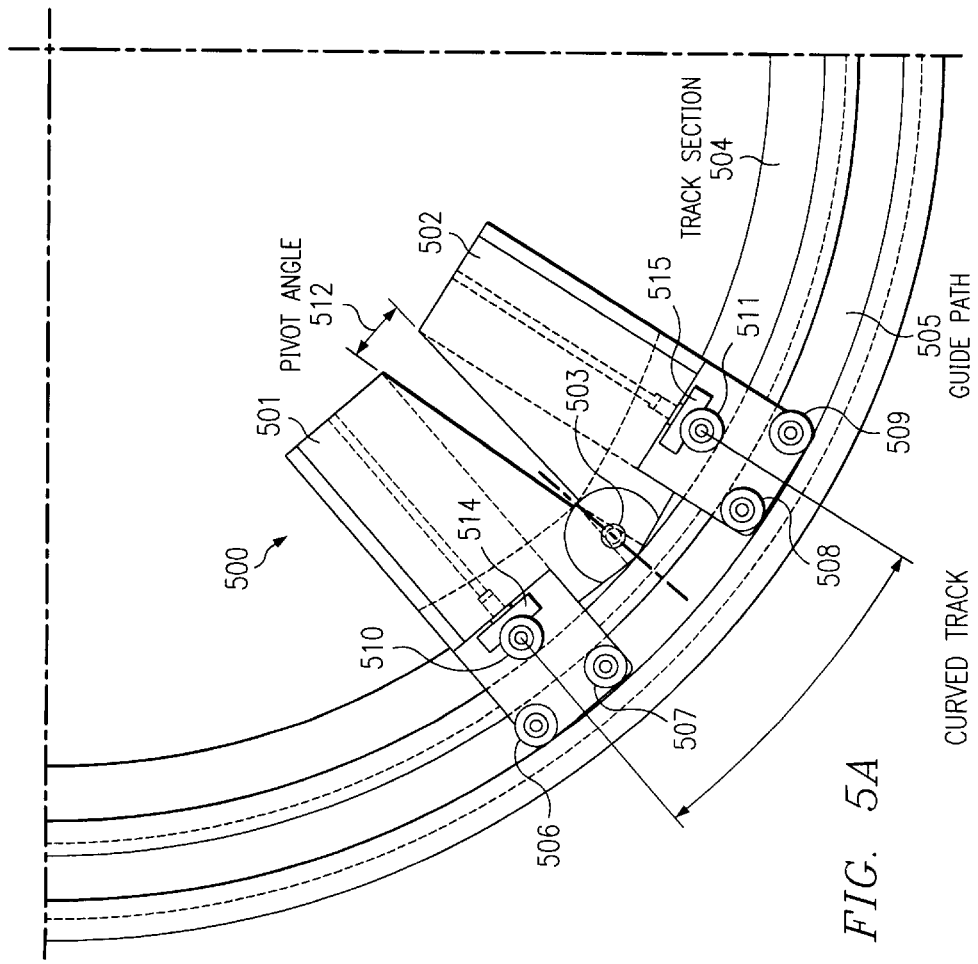
FIG. 5A depicts a top view schematic diagram of an articulated-robot steering mechanism on a curved section of track in accordance with the present invention.

Referring to FIGS. 5A and 5B, top view perspective schematic diagrams illustrating an articulated-robot steering mechanism are depicted in accordance with the present invention. FIG. 5A illustrates the articulated robot 500 on a curved section of track 504, while FIG. 5B illustrates the robot 500 on a straight section of track 504.

The design for the articulated robot 500 eliminates the steering yokes and linkage assemblies found in steering mechanism 300. Instead of using steering yokes, the articulated design splits the robot chassis into two halves 501 and 502, which pivot about a pivot shaft 503 perpendicular to the track 504.

Instead of a single cam follower wheel, the articulated embodiment uses four cam follower wheels 506–509, which are mounted directly on the robot chassis halves 501 and 502. The cam follower wheels 506–509 follow a guide path 505 in track 504 and cause the robot halves 501 and 502 to follow the contours of the track 504.

The robot 500 has two pairs of guide wheels, of which only wheels 514 and 515 are pictured (the other two guide wheels are directly below 514 and 515). The guide wheels 514 and 515 are steered around curved sections of track 504 and maintain proper contact with the track surface due to the angles of displacement 512 and 513 between the chassis halves 501 and 502. The chassis pivot angles 512 and 513 are determined by the alignment of the cam follower wheels 506–509 within the guide path 505.

The pivot action of the articulated robot sections 501 and 502 allows the cam follower wheels 506–509 and guide wheels 514 and 515 to remain tangent to the direction of motion, similar to steering mechanism 300 above. At least one drive wheel 510 and 511 is mounted in each articulated chassis section 501 and 502, respectively. Similar to steering mechanism 300, the consistent tangential direction of the cam follower wheels 506–509 and guide wheels 514 and 515 ensure that the drive wheels 510 and 511 will maintain full contact with the track 504, eliminating skidding as the robot 500 moves between curved and straight sections of track.

Figure 6:
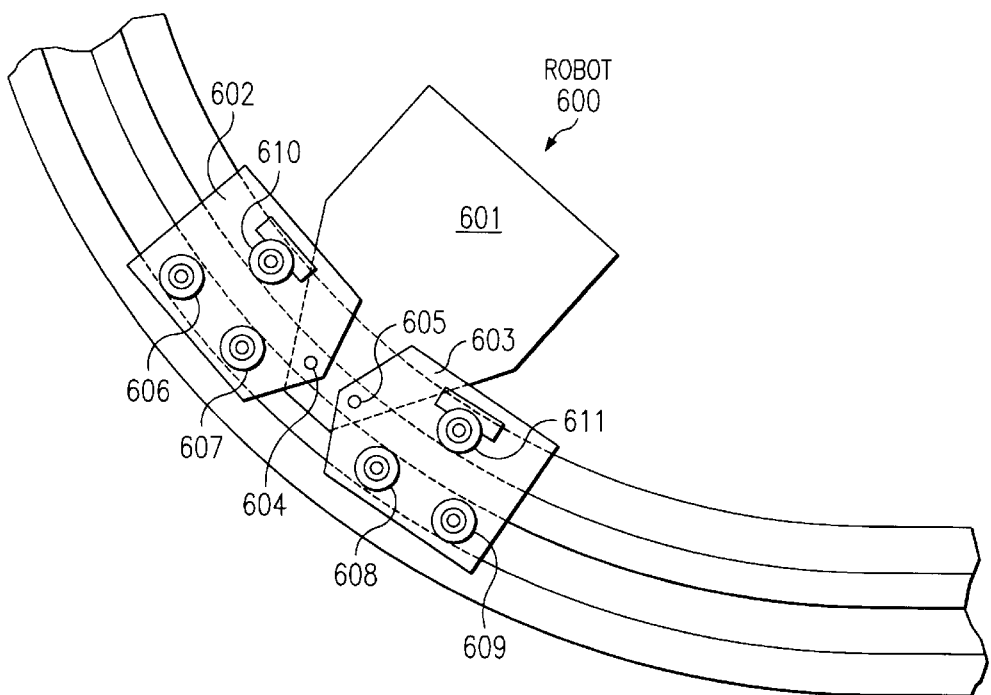
FIG. 6 depicts a top view perspective schematic diagram illustrating an articulated-robot steering mechanism with multiple pivot points in accordance with the present invention.

Referring now to FIG. 6, a top view perspective schematic diagram illustrating an articulated-robot steering mechanism with multiple pivot points is depicted in accordance with the present invention. The design of robot 600 is similar to robot 500 in that a single cam follower wheel is replaced with four cam follower wheels 606–609, and the cam follower wheels 606–609 and guide wheels 610 and 611 are all attached directly to articulating robot chassis sections 602 and 603, rather than pivoting yokes. (Similar to robot 500, robot 600 also has two guide wheels not shown, which are directly below wheels 610 and 611.) However, unlike robot 500, the chassis of robot 600 is divided into three sections 601, 602 and 603, rather than two.

Chassis sections 602 and 603 contain the steering elements and pivot on separate pivot points 604 and 605. These pivot points 604 and 605 also attach the steering chassis sections 602 and 603 to the central chassis section 601.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A steering mechanism for a track-mounted robot, the steering mechanism comprising:

an articulated robot chassis, wherein the chassis is divided into at least a first section and a second section that pivot about at least a first axis;

at least one guide component coupled to each of the first section and the second section, wherein each guide component runs along the track;

at least one cam follower coupled to each the first section and the second section, wherein each cam follower follows a cam surface of the track; and a first drive component coupled to the first section and a second drive component coupled to the second section, wherein the first drive component and the second drive component move the track-mounted robot along the track;

wherein rotation of the first section and the second section causes the guide component to maintain a movement path tangent to the track as the cam followers move along the cam surface of the track.

2. The steering mechanism according to claim 1, wherein the guide components are wheels.

3. The steering mechanism according to claim 1, wherein the cam followers are wheels.

4. The steering mechanism according to claim 1, wherein the robot moves along straight and curved track.

5. The steering mechanism according to claim 1, wherein the first drive component and the second drive component are drive wheels.

6. The steering mechanism according to claim 1, wherein the first component and the second component pivot with respect to each other about the first axis.

7. The steering mechanism according to claim 1, wherein the first section is coupled to a central chassis section and pivots with respect to the central chassis section about the first axis, and wherein the second section is coupled to the central chassis section and pivots with respect to the central chassis section about a second axis.

* * * * *